April 19, 1932.  H. L. KRAEFT  1,854,337
VELOCIPEDE CONSTRUCTION
Filed Dec. 29, 1930
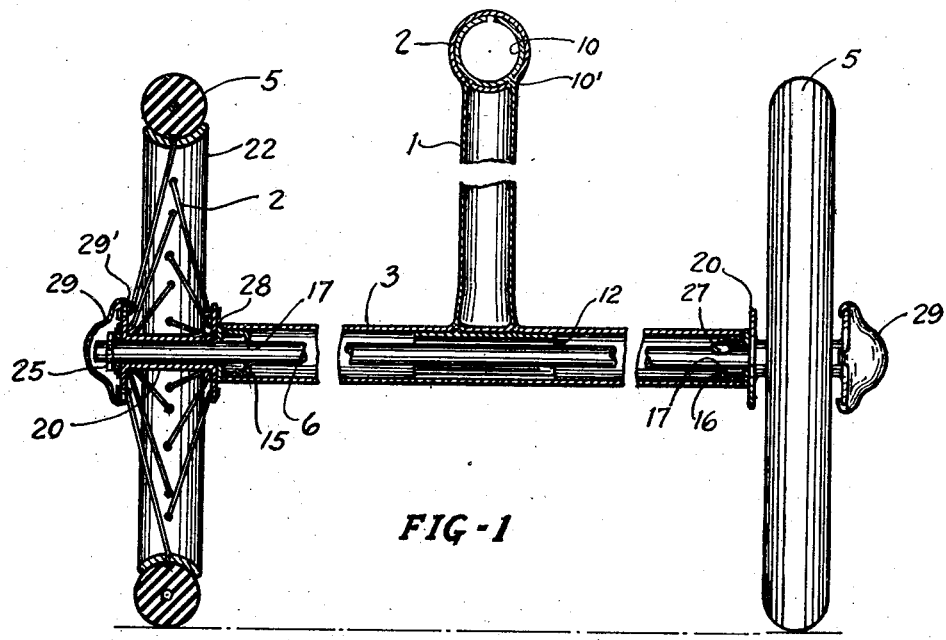
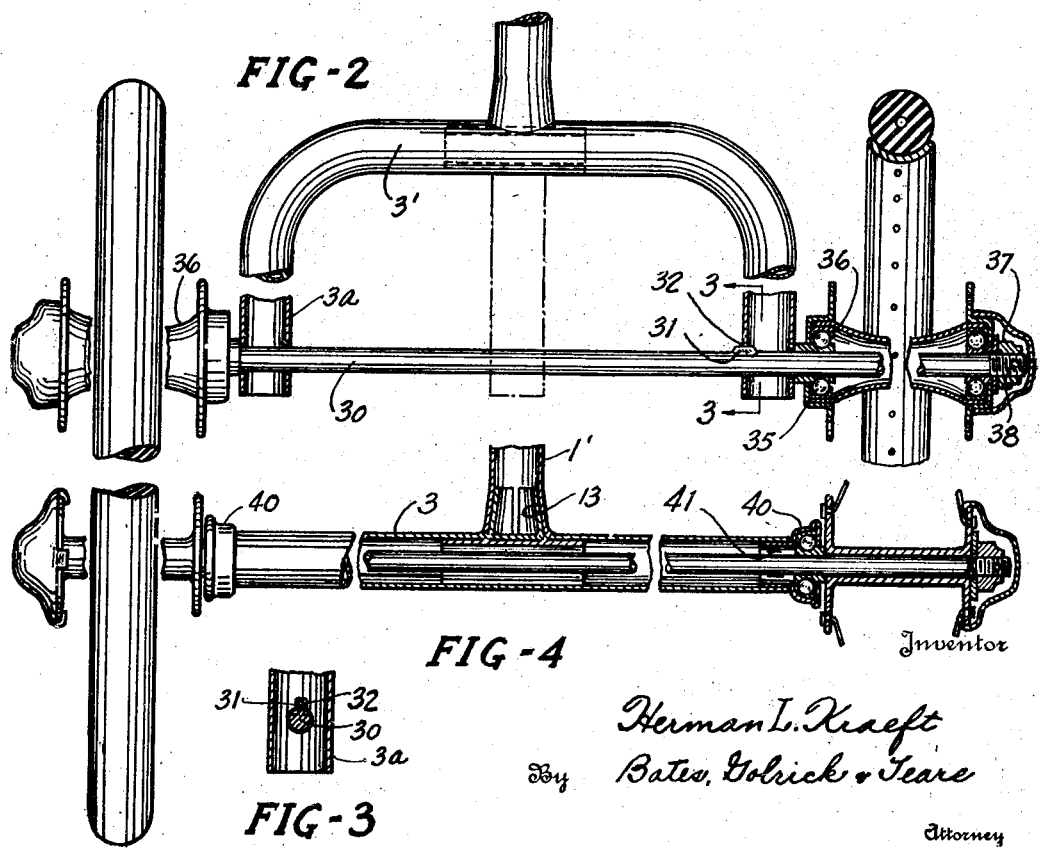
Inventor
Herman L. Kraeft
By Bates, Golrick & Teare
Attorney Patented Apr. 19, 1932

1,854,337

UNITED STATES PATENT OFFICE

HERMAN L. KRAEFT, OF CLEVELAND, OHIO, ASSIGNOR TO MURRAY-OHIO MFG. COMPANY, OF CLEVELAND, OHIO, A CORPORATION OF OHIO

VELOCIPEDE CONSTRUCTION

Application filed December 29, 1930. Serial No. 505,219.

An object of this invention is to provide a simple and strong tubular frame for a juvenile vehicle.

Another object is to provide an improved and simplified axle mounting for a pair of wheels on a child's velocipede.

A specific object is to provide an axle construction for a juvenile vehicle, particularly a tricycle, which will permit the wheels and axle to be removed, for greater convenience in packing and shipment, yet, by means of which, re-assembly of the disassociated parts is a very simple matter.

Another specific object is to provide an anti-friction bearing arrangement for a pair of wheels on a juvenile vehicle, such as a tricycle, which arrangement will substantially cut down the required number of parts, particularly the anti-friction bearing parts.

Other objects and features of the invention will become apparent from the following description relating to the accompanying drawings, showing the preferred forms. The essential characteristics of the invention are summarized in the claims.

Referring to the drawings, Fig. 1 is a substantially central cross sectional view through the backbone, steering column and one form of rear axle support for a tricycle; Fig. 2 is a rear elevation of a different form of tricycle frame, showing portions thereof broken away to illustrate the manner of supporting the axle; Fig. 3 is a detailed sectional view taken substantially along the line 3—3 on Fig. 2, and Fig. 4 is a substantially central cross sectional view of another form of axle supporting arrangement.

Referring again to the drawings, and first to Fig. 1, 1 indicates the so-called backbone of a tricycle frame, at the forward end of which is a tubular steering column member 2. At the rear end of the backbone is a transverse cross beam 3. Both the members 2 and 3, as shown, are integrally joined to the backbone, and the cross beam 3 completely houses the portions of the axle 6 intermediate the wheels 5.

The steering column head 2 comprises, as shown, a single piece metal tube, preferably directly and electrically butt welded to the forward end of the backbone tube 1. The joint between the backbone and column tube is made particularly strong by reason of an expedient consisting in providing and inner reinforce member 10, shown as comprising a split metallic sleeve, which sleeve is integrally joined to the interior of the tube 2 as at 10', opposite the region in which the weld occurs between the tubes 1 and 2. The manner in which the metal of two intersecting tubes such as shown, and the reinforcing insert 10 is consolidated, is fully set forth in a separate application, namely Serial No. 505,220, filed December 29th, 1930.

The joint between the backbone tube 1 and the cross beam tube 3, as shown, is made essentially similarly to the joint between members 1 and 2; the rear end of the tube 1 being spread out slightly in one plane, namely that shown in Fig. 1, and directly butt welded to the tube 3. There is also a hollow metallic reinforce member 12 which extends entirely across the joint between the tubes 1 and 3, as shown, and which is integrally joined to the tube 1, through the medium of the wall of the tube 3.

The frame unit constructed as above described, is unusually sturdy and very simple, requiring a comparatively small number of parts and a minimum of labor to construct the unit.

The steering column 2 of course, contains suitable bearings for the stem of a steering fork (not illustrated) and the backbone tube 1 is of course adapted to support any convenient saddle structure (not shown) for the tricycle.

The arrangement of bearings and the support for the axle may be considerably modified, but as shown in Fig. 1, the axle is directly carried by two cup-shaped metal inserts, 15 and 16, which are centrally apertured, as at 17, to receive the axle 6.

Both wheels, as shown, have flanged hub members 20, adapted to support the usual wire spokes 21 connecting the flanges with a suitable tire receiving ring 22. The ends of the axle 6 extend through the hubs 20 and therebeyond to receive suitable securing means, such as, for example, cotter pins 25 in suitable transverse openings in respective ends of the axle. Instead of the cotter pins, I may use threaded nuts, castellated for example, or one end of the axle may have a solid head (not shown) and the other end a suitable nut or equivalent securing means. As illustrated, both wheels are disengageable from respective ends of the axle, simply by removing the cotter pins 25.

With the wheel shown at the left in Fig. 1 removed from the axle, the other wheel and the axle may be withdrawn and removed from the frame, thereby considerably reducing the size of the package necessary to enclose the tricycle for shipment. In order to prevent the axle from turning within the housing 3, the circular opening 17 in the axle support 16 is recessed at one side and the axle has a nib at 27, which slides into the recess when the axle is placed into operating position. If desired, suitable spacing and housing closing washers may be provided between the hub of the wheel 5 and the ends of the housing tube 3, as at 28. Any convenient form of hub caps may be employed. As shown, there are pressed metal caps 29 with lugs 29′ adapted to clasp the outer flanges of the wheel hubs to hold the caps in place.

Referring now to Fig. 2, this shows a somewhat different form of frame, in that the cross beam tube 3′ has rearwardly and downwardly extending arm portions 3a. This provides spaced axle supporting portions near the outer sides of the frame, the ends of the frame arms 3a being provided with registering apertures for receiving the axle 30, which has a nib at 31 lying in a suitable lateral recess 32, in one of said registering openings. In order to permit the axle 30 to be assembled in, and removed from the frame endwise, the axle supporting openings in both walls of one of the arms 3a (for example that at the right in Fig. 2), are made with recesses sufficiently large to allow the nib to slide through.

As shown in Fig. 2, the wheels are of the ball bearing type and any anti-friction bearing arrangement may be substituted for that illustrated. Fig. 2 shows suitable ball bearing assemblies at 35 in both ends of each hollow hub 36 of such wheel, and the wheels are shown as held onto the axle ends by suitable castellated nuts 37 and the usual securing pins 38, entering lateral openings in the respective ends of the axle.

Fig. 4 illustrates a modification of the joint between the backbone tube and the rear axle supporting tube of the type shown in Fig. 1, there being an additional reinforce for the rearmost end of the backbone tube, the reinforce being in the nature of a split sleeve 13 welded in place at the time the butt weld is effected between the backbone tube and the cross tube.

Fig. 4 further differs from the previously described figures in that the axle is allowed to turn, there being anti-friction bearing assemblies, including outer tubular casing members 40, which are reduced as at 41 and pressed into the respective ends of the axle supporting tube 3. With this form, a very inexpensive wheel may be used, such for example as that illustrated, while at the same time, the wheels are completely anti-frictionally supported. It is obvious that because only two ball bearing assemblies are required, a tricycle equipped with this form of wheel support, may be made with much less expense, while having substantially the same operating advantages as a more expensive tricycle equipped with ball bearings in both ends of each wheel hub.

I claim:

1. In a juvenile vehicle, a longitudinally extending metal frame member, and a transverse continuous metal tube, means integrally joining one end of the frame member to the surface of the tube, and a metallic insert rigidly positioned within the transverse tube and extending continuously past said frame member to reinforce the tube.

2. In a cycle frame, a metallic backbone member and a transverse continuous metal tube integrally joined to the backbone and extending across the end thereof in a continuous piece, there being a metal insert rigidly secured within the tube and reinforcing the same adjacent said backbone.

3. In a velocipede, a pair of wheels, a frame located between said wheels and including spaced axle supporting members having openings therein, an axle passing through said openings and beyond said frame to support the wheels, there being a circular opening in the frame having a recess at one side thereof and the axle having an integral projection arranged to be slidably embraced by the recess whereby the axle is prevented from turning and may be removed endwise to decrease the packing space required for the vehicle.

4. In a velocipede, a main frame, including a rearwardly disposed transverse axle support, an axle with the ends thereof projecting from the transverse support, wheels on respective said ends, and anti-friction bearings in fixed position in said transverse support adjacent respective wheels.

5. In a velocipede, a main frame and an axle housing carried thereby and extending transversely thereof, an axle contained by said housing and projecting from the ends thereof to support the usual wheels and anti-friction bearings in fixed position to the ends of said housing adjacent respective wheels.

6. In a velocipede, a frame, comprising, a backbone and an axle housing positioned at right angles to the backbone, an axle extending through said housing, apertured members carried in the ends of said housing to receive and support the axle, one of said members having means thereon to slidably engage the axle and the axle having a non-circular portion to engage said means to prevent the axle from turning.

In testimony whereof, I hereunto affix my signature.

HERMAN L. KRAEFT.